United States Patent
Boss et al.

(10) Patent No.: US 9,909,885 B2
(45) Date of Patent: Mar. 6, 2018

(54) DETERMINING A TRAVEL ROUTE

(71) Applicant: International Business Machines Corporation, Armonk, NY (US)

(72) Inventors: Gregory J. Boss, Saginaw, MI (US); Rick A. Hamilton, II, Charlottesville, VA (US); Jacquelyn A. Martino, Cold Spring, NY (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 14/799,662

(22) Filed: Jul. 15, 2015

(65) Prior Publication Data

US 2015/0330799 A1 Nov. 19, 2015

Related U.S. Application Data

(62) Division of application No. 12/578,780, filed on Oct. 14, 2009, now abandoned.

(51) Int. Cl.

| G01C 21/34 | (2006.01) |
| --- | --- |
| G01S 19/42 | (2010.01) |
| G06Q 20/14 | (2012.01) |
| G07B 15/06 | (2011.01) |
| G06Q 10/06 | (2012.01) |
| G06Q 30/02 | (2012.01) |
| G06Q 30/08 | (2012.01) |

(52) U.S. Cl.
CPC ......... *G01C 21/34* (2013.01); *G01C 21/3461* (2013.01); *G01C 21/3476* (2013.01);
(Continued)

(58) Field of Classification Search
CPC ............... G01C 21/34; G01C 21/3407; G01C 21/3415; G01C 21/3453; G01C 21/3461;
(Continued)

(56) References Cited

U.S. PATENT DOCUMENTS

| 4,336,522 A | 6/1982 | Graham |
| 5,086,389 A | 2/1992 | Hassett et al. |

(Continued)

FOREIGN PATENT DOCUMENTS

| AU | 2007100542 | 12/2007 |
| DE | 19634340 | 2/1998 |

(Continued)

OTHER PUBLICATIONS

IBM launches 'green' consulting services [online]; iNSnet Foundation Sep. 29, 2008; [retrieved on Feb. 29, 2012]. Retrieved from the Internet URL: http://web.archive.org/web/20081002035154/http://www.insnet.org/ins_headlines.rsml?id=23782&photo=&title=IBM%20launches%20%green%27%20consulting%services; 3 pages.

(Continued)

*Primary Examiner* — Thomas G Black
*Assistant Examiner* — Sze-Hon Kong
(74) *Attorney, Agent, or Firm* — Schmeiser, Olsen & Watts; John Pivnichny

(57) ABSTRACT

An approach for determining a route is provided. A rule is retrieved, which indicates a number of recommended routes passing through a constrained area is not permitted to exceed a threshold. After a receipt of N requests from N respective users for N routes, N recommended routes passing through the constrained area are determined and presented to the N users. After determining the N recommended routes and based on a receipt of a request from an (N+1)-th user for an (N+1)-th route, the (N+1)-th route, which passes through the constrained area, is determined. Based on the retrieved rule and the (N+1)-th route passing through the constrained area, N+1 is determined to not exceed the second number. Responsive to determining N+1 does not exceed the threshold, the (N+1)-th route is designated as an (N+1)-th recommended route.

4 Claims, 7 Drawing Sheets

(52) U.S. Cl.
CPC .......... *G01C 21/3484* (2013.01); *G01S 19/42* (2013.01); *G06Q 10/06316* (2013.01); *G06Q 20/145* (2013.01); *G06Q 30/0283* (2013.01); *G06Q 30/08* (2013.01); *G07B 15/06* (2013.01)

(58) Field of Classification Search
CPC ............ G01C 21/3492; G01C 21/3626; G01C 21/3476; G01C 21/3484; G08G 1/0125; G08G 1/096733; G08G 1/096805; G08G 1/096833; G01S 19/42; G06Q 10/06316; G06Q 20/145; G06Q 30/0283; G06Q 30/08; G07B 15/06
See application file for complete search history.

(56) References Cited

U.S. PATENT DOCUMENTS

| | | |
|---|---|---|
| 5,489,777 A | 2/1996 | Stedman et al. |
| 5,532,690 A | 7/1996 | Hertel |
| 5,583,765 A | 12/1996 | Kleehammer |
| 5,694,322 A | 12/1997 | Westerlage et al. |
| 5,717,389 A | 2/1998 | Mertens et al. |
| 5,825,007 A | 10/1998 | Jesadanont |
| 5,864,831 A | 1/1999 | Schuessler |
| 5,892,463 A | 4/1999 | Hikita et al. |
| 5,920,057 A | 7/1999 | Sonderegger et al. |
| 6,018,699 A | 1/2000 | Baron, Sr. et al. |
| 6,078,895 A | 6/2000 | Ryu et al. |
| 6,104,299 A | 8/2000 | Brusseaux et al. |
| 6,234,390 B1 | 5/2001 | Rabe |
| 6,356,838 B1 | 3/2002 | Paul |
| 6,405,132 B1 | 6/2002 | Breed et al. |
| 6,411,889 B1 | 6/2002 | Mizunuma et al. |
| 6,525,673 B1 | 2/2003 | Feldman |
| 6,603,405 B2 | 8/2003 | Smith |
| 6,604,045 B2 | 8/2003 | Kuroda et al. |
| 6,661,352 B2 | 12/2003 | Tiernay et al. |
| 6,693,555 B1 | 2/2004 | Colmenarez et al. |
| 6,696,981 B1 | 2/2004 | Hashimoto |
| 6,700,504 B1 | 3/2004 | Aslandogan et al. |
| 6,738,697 B2 | 5/2004 | Breed |
| 6,843,101 B2 | 1/2005 | Hoek |
| 6,845,362 B2 | 1/2005 | Furuta et al. |
| 6,959,282 B2 | 10/2005 | Kakihara et al. |
| 7,003,398 B2 | 2/2006 | Seligmann |
| 7,053,792 B2 | 5/2006 | Aoki et al. |
| 7,057,501 B1 | 6/2006 | Davis |
| 7,127,413 B1 | 10/2006 | Yanagisawa et al. |
| 7,215,255 B2 | 5/2007 | Grush |
| 7,308,358 B2 | 12/2007 | Nozaki et al. |
| 7,320,430 B2 | 1/2008 | Dawson et al. |
| 7,343,341 B2 | 3/2008 | Sandor et al. |
| 7,375,648 B1 | 5/2008 | Mulka et al. |
| 7,385,525 B2 | 6/2008 | Ho et al. |
| 7,398,924 B2 | 7/2008 | Dawson et al. |
| 7,415,418 B2 | 8/2008 | Zimmerman |
| 7,426,489 B2 | 9/2008 | Van Soestbergen et al. |
| 7,478,055 B2 | 1/2009 | Goino |
| 7,580,808 B2 | 8/2009 | Bos |
| 7,797,267 B2 | 9/2010 | Horvitz |
| 7,908,149 B2 | 3/2011 | Dar et al. |
| 7,966,221 B1 | 6/2011 | Givoly et al. |
| 7,969,325 B2 | 6/2011 | Hamilton, II et al. |
| 7,979,292 B2 | 7/2011 | Hamilton, II et al. |
| 8,055,534 B2 | 11/2011 | Ashby et al. |
| 8,073,460 B1 | 12/2011 | Scofield et al. |
| 8,200,529 B2 | 6/2012 | Hamilton, II et al. |
| 8,219,115 B1 | 7/2012 | Nelissen |
| 8,332,270 B2 | 12/2012 | Sprigg et al. |
| 8,374,911 B2 | 2/2013 | Glachant et al. |
| 8,385,944 B1 | 2/2013 | Nelissen |
| 8,428,859 B2 | 4/2013 | Seltzer et al. |
| 8,447,661 B2 | 5/2013 | Wiseman et al. |
| 8,478,603 B2 | 7/2013 | Boss et al. |
| 8,666,376 B2 | 3/2014 | Ramer et al. |
| 8,812,352 B2 | 8/2014 | Boss et al. |
| 9,189,895 B2 | 11/2015 | Phelan et al. |
| 2001/0037174 A1 | 11/2001 | Dickerson |
| 2001/0056396 A1 | 12/2001 | Goino |
| 2002/0049630 A1 | 4/2002 | Furuta et al. |
| 2002/0065604 A1 | 5/2002 | Sekiyama |
| 2002/0072963 A1 | 6/2002 | Jonge |
| 2002/0084917 A1 | 7/2002 | Hauptman et al. |
| 2002/0103769 A1 | 8/2002 | Smith |
| 2002/0115410 A1 | 8/2002 | Higashino et al. |
| 2003/0037538 A1 | 2/2003 | Rendahl et al. |
| 2003/0040944 A1 | 2/2003 | Hileman |
| 2003/0065630 A1 | 4/2003 | Brown et al. |
| 2003/0110075 A1 | 6/2003 | Shioda et al. |
| 2003/0115095 A1 | 6/2003 | Yamauchi |
| 2003/0191568 A1 | 10/2003 | Breed et al. |
| 2003/0233321 A1 | 12/2003 | Scolini et al. |
| 2004/0039517 A1 | 2/2004 | Biesinger et al. |
| 2004/0049424 A1 | 3/2004 | Murray et al. |
| 2004/0075582 A1 | 4/2004 | Bergan et al. |
| 2004/0093264 A1 | 5/2004 | Shimizu |
| 2004/0119609 A1* | 6/2004 | Solomon ................. G07B 15/02 340/928 |
| 2004/0167861 A1 | 8/2004 | Hedley |
| 2004/0212518 A1 | 10/2004 | Tajima et al. |
| 2004/0236475 A1 | 11/2004 | Chowdhary |
| 2005/0001739 A1 | 1/2005 | Sudou et al. |
| 2005/0003802 A1 | 1/2005 | Joseph |
| 2005/0024189 A1 | 2/2005 | Weber |
| 2005/0049781 A1 | 3/2005 | Oesterling |
| 2005/0168351 A1 | 8/2005 | Saze et al. |
| 2005/0179563 A1 | 8/2005 | Kelley |
| 2005/0187820 A1 | 8/2005 | Mohan |
| 2005/0246190 A1 | 11/2005 | Sandor et al. |
| 2005/0251327 A1* | 11/2005 | Ogasawara ........ G01C 21/3461 701/423 |
| 2005/0256762 A1 | 11/2005 | Dar et al. |
| 2005/0278214 A1 | 12/2005 | Takida |
| 2006/0015394 A1 | 1/2006 | Sorensen |
| 2006/0099064 A1 | 5/2006 | Barrese et al. |
| 2006/0136291 A1 | 6/2006 | Morita et al. |
| 2006/0155486 A1 | 7/2006 | Walsh et al. |
| 2006/0173579 A1 | 8/2006 | Desrochers et al. |
| 2006/0255967 A1 | 11/2006 | Woo et al. |
| 2006/0278705 A1 | 12/2006 | Hedley et al. |
| 2007/0050279 A1* | 3/2007 | Huang .................... G06Q 30/06 705/14.1 |
| 2007/0061057 A1 | 3/2007 | Huang et al. |
| 2007/0063858 A1 | 3/2007 | Lee et al. |
| 2007/0083322 A1 | 4/2007 | Van Ee |
| 2007/0100687 A1 | 5/2007 | Yoshikawa |
| 2007/0106465 A1 | 5/2007 | Adam et al. |
| 2007/0131864 A1 | 6/2007 | Ellis et al. |
| 2007/0135990 A1 | 6/2007 | Seymour et al. |
| 2007/0203642 A1 | 8/2007 | Arnold-Huyser et al. |
| 2007/0260393 A1 | 11/2007 | Abernethy, Jr. et al. |
| 2007/0268140 A1 | 11/2007 | Tang et al. |
| 2007/0271034 A1 | 11/2007 | Perry |
| 2007/0271035 A1 | 11/2007 | Stoschek et al. |
| 2007/0278300 A1 | 12/2007 | Dawson et al. |
| 2007/0299607 A1 | 12/2007 | Cubillo |
| 2008/0004926 A1 | 1/2008 | Horvitz et al. |
| 2008/0021723 A1 | 1/2008 | Devarakonda |
| 2008/0033644 A1 | 2/2008 | Bannon |
| 2008/0061953 A1 | 3/2008 | Bhogal et al. |
| 2008/0086310 A1 | 4/2008 | Campbell |
| 2008/0091341 A1* | 4/2008 | Panabaker ............ G06Q 10/10 701/533 |
| 2008/0120024 A1 | 5/2008 | Obradovich et al. |
| 2008/0122652 A1 | 5/2008 | Tengler et al. |
| 2008/0129548 A1 | 6/2008 | Firestone |
| 2008/0140318 A1 | 6/2008 | Breed |
| 2008/0148816 A1 | 6/2008 | Groves |
| 2008/0161989 A1 | 7/2008 | Breed |
| 2008/0175438 A1 | 7/2008 | Alves |
| 2008/0195428 A1 | 8/2008 | O'Sullivan |
| 2008/0208680 A1 | 8/2008 | Cho |
| 2008/0221948 A1 | 9/2008 | Eglen et al. |
| 2008/0236141 A1 | 10/2008 | Peng et al. |

(56) References Cited

U.S. PATENT DOCUMENTS

| | | |
|---|---|---|
| 2009/0008631 A1 | 1/2009 | Hurkx et al. |
| 2009/0018902 A1 | 1/2009 | Miller et al. |
| 2009/0024419 A1 | 1/2009 | McClellan et al. |
| 2009/0106095 A1 | 4/2009 | Ding et al. |
| 2009/0157307 A1 | 6/2009 | Krumm et al. |
| 2009/0157540 A1 | 6/2009 | Black et al. |
| 2009/0210242 A1* | 8/2009 | Black .................. G06Q 10/047 705/14.1 |
| 2009/0210261 A1 | 8/2009 | Mortimore, Jr. |
| 2009/0222338 A1 | 9/2009 | Hamilton, II et al. |
| 2009/0228350 A1 | 9/2009 | Robinson et al. |
| 2009/0240584 A1 | 9/2009 | Singh |
| 2009/0287408 A1 | 11/2009 | Gerdes et al. |
| 2009/0295599 A1 | 12/2009 | Coffee et al. |
| 2009/0327148 A1* | 12/2009 | Kamar .................. G06Q 30/06 705/80 |
| 2010/0057346 A1* | 3/2010 | Ehrlacher .......... G01C 21/3461 701/533 |
| 2010/0057532 A1 | 3/2010 | Sanguinetti et al. |
| 2010/0070128 A1 | 3/2010 | Johnson |
| 2010/0082491 A1 | 4/2010 | Rosenblatt et al. |
| 2010/0085213 A1 | 4/2010 | Turnock et al. |
| 2010/0106567 A1 | 4/2010 | McNew et al. |
| 2010/0153125 A1 | 6/2010 | Hamilton, II et al. |
| 2010/0153191 A1 | 6/2010 | Hamilton, II et al. |
| 2010/0153192 A1 | 6/2010 | Hamilton, II et al. |
| 2010/0153193 A1 | 6/2010 | Ashby et al. |
| 2010/0156670 A1 | 6/2010 | Hamilton, II et al. |
| 2010/0161391 A1 | 6/2010 | Ashby et al. |
| 2010/0161392 A1 | 6/2010 | Ashby et al. |
| 2010/0201505 A1 | 8/2010 | Honary et al. |
| 2010/0205060 A1 | 8/2010 | Athsani et al. |
| 2010/0217525 A1 | 8/2010 | King et al. |
| 2010/0250053 A1 | 9/2010 | Grill et al. |
| 2010/0268449 A1 | 10/2010 | Feng |
| 2010/0332241 A1 | 12/2010 | Boss et al. |
| 2010/0332315 A1 | 12/2010 | Kamar et al. |
| 2011/0071721 A1 | 3/2011 | Gilfillan et al. |
| 2011/0082797 A1 | 4/2011 | Glachant et al. |
| 2011/0087430 A1 | 4/2011 | Boss et al. |
| 2011/0087524 A1 | 4/2011 | Boss et al. |
| 2011/0087525 A1 | 4/2011 | Boss et al. |
| 2011/0112908 A1 | 5/2011 | Rowley et al. |
| 2011/0166958 A1 | 7/2011 | Hamilton, II et al. |
| 2012/0078743 A1 | 3/2012 | Betancourt |
| 2013/0080307 A1 | 3/2013 | Hoffberg |
| 2014/0310192 A1 | 10/2014 | Boss et al. |
| 2015/0330799 A1 | 11/2015 | Boss et al. |

FOREIGN PATENT DOCUMENTS

| | | |
|---|---|---|
| EP | 1519288 | 3/2005 |
| JP | 2000172892 | 6/2000 |
| JP | 2001101561 | 4/2001 |
| JP | 2001283377 | 10/2001 |
| JP | 2002032893 | 1/2002 |
| JP | 2004157842 | 6/2004 |
| WO | 02071366 | 9/2002 |
| WO | 2009065638 | 5/2009 |

OTHER PUBLICATIONS

Regan, Keith; Blue Pushes Green With Carbon Offset Modeler [online]; E-Commerce Times (Part of the ECT News Network) originally posted May 22, 2008; [retrieved on Feb. 29, 2012]. Retrieved from the Internet URL: http://www.crmbuyer.com/story/63124.html; 3 pages.
Carbon offset [online]; Wikipeida; [retrieved on Feb. 29, 2012]. Retrieved from the Internet URL: http://en.wikipedia.org/wiki/Carbon_offset; 16 pages.
Komanoff, Charles; Auto Fee NYC: A Roadway Pricing Primer; Transportation Alternatives Jul./Aug. 1994 Issue, 4 pages.
Komanoff, Charles; Environmental Consequences of Road Pricing; A Scoping Paper for the Energy Foundation; Apr. 1997; 24 pages.
Peak-time Driving Tolls Limit Pollution, Traffic [online]; AzCentral.com; [retrieved on Aug. 14, 2008]. Retrieved from the Internet URL: http://www.azcentral.com/arizonarepublic/local/articles/2008/08/08/20080809earthtalk080; 1 page.
Florida's Turnpike Offers Important Hurricane Evacuation Tips; Florida's Turnpike Enterprise Press Release, Jun. 1, 2006; 2 pages.
State Toll Exemption Policy [online]; [retrieved on Nov. 8, 2010]. Retrieved from the Internet URL: https://www.txdot.gob/cgi-bin/pfpage.plx; Texas Department of Transportation; 1 page.
Bob Poole in WSJ on getting rid of Toll Plazas [online]; TollRoadNews; Nov. 6, 2007 [retrieved on Nov. 1, 2010]. Retrieved from the Internet URL: http//www.tollroadnews.com/node/3232; 8 pages.
Priewasser, Reinhold; Ecological sustainability and personal behavior: relations demonstrated by the decision-making process of selecting a certain transportation mean; Environmental Management and Health, vol. 10 Issue 3; 1999; 8 pages.
Bjerde et al.; High Level Group on Transport Infrastructure Charging Final Report on Options for Charging Users Directly for Transport Infrastructure Operating Costs; Sep. 9, 1999; 27 pages.
Real-Time Ridesharing Launches on SR 520 to Save Commuters Time, Money; Business Wire; Jan. 27, 2011; 3 pages.
Office Action (dated Sep. 22, 2011) for U.S. Appl. No. 12/490,617, filed Jun. 24, 2009.
Amendment filed Dec. 19, 2011 in response to Office Action (dated Sep. 22, 2011) for U.S. Appl. No. 12/490,617, filed Jun. 24, 2009.
Final Office Action (dated Jan. 30, 2012) for U.S. Appl. No. 12/490,617, filed Jun. 24, 2009.
Amendment filed Mar. 27, 2012 in response to Final Office Action (dated Jan. 30, 2012) for U.S. Appl. No. 12/490,617, filed Jun. 24, 2009.
Office Action (dated Nov. 16, 2011) for U.S. Appl. No. 12/652,127, filed Jan. 5, 2010.
Amendment filed Mar. 15, 2012 in response to Office Action (dated Nov. 16, 2011) for U.S. Appl. No. 12/652,127, filed Jan. 5, 2010.
Final Office Action (dated Apr. 3, 2012) for U.S. Appl. No. 12/652,127, filed Jan. 5, 2010.
Office Action (dated Aug. 2, 2010) for U.S. Appl. No. 12/341,009, filed Dec. 22, 2008.
Amendment filed Oct. 29, 2010 in response to Office Action (dated Aug. 2, 2010) for U.S. Appl. No. 12/341,009, filed Dec. 22, 2008.
Final Office Action (dated Nov. 12, 2010) for U.S. Appl. No. 12/341,009, filed Dec. 22, 2008.
Notice of Abandonment (dated Jun. 10, 2011) for U.S. Appl. No. 12/341,009, filed Dec. 22, 2008.
Office Action (dated Jul. 30, 2010) for U.S. Appl. No. 12/336,820, filed Dec. 17, 2008.
Amendment filed Oct. 29, 2010 in response to Office Action (dated Jul. 30, 2010) for U.S. Appl. No. 12/336,820, filed Dec. 17, 2008.
Final Office Action (dated Nov. 26, 2010) for U.S. Appl. No. 12/336,820, filed Dec. 17, 2008.
Notice of Abandonment (dated Jun. 21, 2011) for U.S. Appl. No. 12/336,820, filed Dec. 17, 2008.
Office Action (dated Oct. 29, 2010) for U.S. Appl. No. 12/336,587, filed Dec. 17, 2008.
Amendment filed Jan. 28, 2011 in response to Office Action (dated Oct. 29, 2010) for U.S. Appl. No. 12/336,587, filed Dec. 17, 2008.
Final Office Action (dated Apr. 8, 2011) for U.S. Appl. No. 12/336,587, filed Dec. 17, 2008.
Notice of Appeal filed Jul. 6, 2011 in response to Final Office Action (dated Apr. 8, 2011) for U.S. Appl. No. 12/336,587, filed Dec. 17, 2008.
Appeal Brief filed Sep. 2, 2011 for U.S. Appl. No. 12/336,587, filed Dec. 17, 2008.
Office Action (dated Apr. 30, 2012) for U.S. Appl. No. 12/578,627, filed Oct. 14, 2009.
Mao et al.; Route Flap Damping Exacerbates Internet Routing Convergence; pp. 221-233; SIGCOMM '02, Aug. 19-23, 2002, Pittsburgh, PA, USA.

(56) References Cited

OTHER PUBLICATIONS

Gitte Lindgaard; Making the Business Our Business: One Path to Value-Added HCI; pp. 13-17; Human Oriented Technology Lab, Carleton University, Ottawa, Ontario K1S 5B6, Canada; interactions / May + Jun. 2004.
Boss, et al.; Patent Application; Determining Travel Routes by Using Fee-Based Location Preferences; U.S. Appl. No. 12/578,627, filed Oct. 14, 2009.
Boss, et al.; Patent Application; Environmental Stewardship Based on Driving Behavior; U.S. Appl. No. 12/578,653, filed Oct. 14, 2009.
Amendment filed Jul. 30, 2012 in response to Office Action (dated Apr. 30, 2012) for U.S. Appl. No. 12/578,627, filed Oct. 14, 2009.
Final Office Action (dated Oct. 10, 2012) for U.S. Appl. No. 12/578,627; filed Oct. 14, 2009.
Notice of Allowance (dated Nov. 21, 2012) for U.S. Appl. No. 12/490,617, filed Jun. 24, 2009.
Request for Continued Examination and Amendment filed Jul. 5, 2012 in response to Final Office Action (dated Apr. 3, 2012) for U.S. Appl. No. 12/652,127, filed Jan. 5, 2010.
Office Action (dated Jun. 5, 2013) for U.S. Appl. No. 12/578,780, filed Oct. 14, 2009.
Amendment filed Jun. 28, 2013 in response to Office Action (dated Jun. 5, 2013) for U.S. Appl. No. 12/578,780, filed Oct. 14, 2009.
Final Office Action (dated Oct. 3, 2013) for U.S. Appl. No. 12/578,780, filed Oct. 14, 2009.
Preliminary Amendment and Request for Continued Examination filed Dec. 26, 2013 in response to Final Office Action (dated Oct. 3, 2013) for U.S. Appl. No. 12/578,780, filed Oct. 14, 2009.
Office Action (dated Sep. 19, 2014) for U.S. Appl. No. 12/578,780; filed Oct. 14, 2009.
Amendment filed Dec. 19, 2014 in response to Office Action (dated Sep. 19, 2014) for U.S. Appl. No. 12/578,780; filed Oct. 14, 2009.
Final Office Action (dated Apr. 17, 2015) for U.S. Appl. No. 12/578,780, filed Oct. 14, 2009.
Final Office Action (dated May 14, 2015) for U.S. Appl. No. 12/578,627, filed Oct. 14, 2009.
Patent Board Decision—Examiner Affirmed (Mail Date Jan. 29, 2015) for U.S. Appl. No. 12/336,587, filed Dec. 17, 2008.
Amendment filed Sep. 8, 2014 in response to Office Action (dated May 13, 2014) for U.S. Appl. No. 12/652,127, filed Jan. 5, 2010.
Amendment filed Dec. 19, 2014 in response to Office Action (dated Sep. 19, 2014) for U.S. Appl. No. 12/578,780, filed Oct. 14, 2009.
Final Office Action (dated Feb. 6, 2015) for U.S. Appl. No. 12/652,127, filed Jan. 5, 2010.
Notice of Allowance (dated Mar. 31, 2014) for U.S. Appl. No. 12/578,653, filed Oct. 14, 2009.
Office Action (dated May 13, 2014) for U.S. Appl. No. 12/652,127, filed Jan. 5, 2010.
Office Action (dated Sep. 19, 2014) for U.S. Appl. No. 12/578,780, filed Oct. 14, 2009.
Office Action (dated Oct. 8, 2014) for U.S. Appl. No. 12/652,127, filed Jan. 5, 2010.
Office Action (dated Dec. 26, 2014) for U.S. Appl. No. 12/578,627, filed Oct. 14, 2009.
Samuel, Peter; IBM working on statement on controversial variable rate toll patent; Toll Roads News; Apr. 5, 2008; 4 pages.
Amendment filed Mar. 26, 2015 in response to Office Action (dated Dec. 26, 2014) for U.S. Appl. No. 12/578,627, filed Oct. 14, 2009.
Notice of Allowance (dated Sep. 17, 2013) for U.S. Appl. No. 12/578,653, filed Oct. 14, 2009.
Request for Continued Examination filed Sep. 24, 2013 for U.S. Appl. No. 12/578,653, filed Oct. 14, 2009.
Office Action (dated May 8, 2012) for U.S. Appl. No. 12/572,001, filed Oct. 1, 2009.
Amendment filed Jul. 24, 2012 in reply to Office Action (dated May 8, 2012) for U.S. Appl. No. 12/572,001, filed Oct. 1, 2009.
Office Action (dated Oct. 9, 2012) for U.S. Appl. No. 12/572,001, filed Oct. 1, 2009.
Examiner's Answer (Mail Date Nov. 25, 2011) to Appeal Brief filed Sep. 2, 2011 for U.S. Appl. No. 12/336,587, filed Dec. 17, 2008.
Reply Brief filed Jan. 24, 2012 in response to Examiner's Answer (Mailing Date Nov. 25, 2011) to Appeal Brief filed Sep. 2, 2011 for U.S. Appl. No. 12/336,587, filed Dec. 17, 2008.

Notice of Allowance (dated Feb. 22, 2011) for U.S. Appl. No. 12/341,054, filed Dec. 22, 2008.
Notice of Allowance (dated Mar. 7, 2011) for U.S. Appl. No. 12/336,742, filed Dec. 17, 2008.
Office Action (dated Aug. 19, 2010) for U.S. Appl. No. 12/341,087, filed Dec. 22, 2008.
Amendment filed Nov. 19, 2010 in response to Office Action (dated Aug. 19, 2010) for U.S. Appl. No. 12/341,087, filed Dec. 22, 2008.
Notice of non-compliant or non-responsive amendment (dated Nov. 29, 2010) for U.S. Appl. No. 12/341,087, filed Dec. 22, 2008.
Amendment filed Dec. 27, 2010 in response to Notice of non-compliant or non-responsive amendment (dated Nov. 29, 2010) for U.S. Appl. No. 12/341,087, filed Dec. 22, 2008.
Notice of non-compliant or non-responsive amendment (dated Jan. 10, 2011) for U.S. Appl. No. 12/341,087, filed Dec. 22, 2008.
Amendment filed Jan. 31, 2011 in response to Notice of non-compliant or non-responsive amendment (dated Jan. 10, 2011) for U.S. Appl. No. 12/341,087, filed Dec. 22, 2008.
Final Office Action (dated Apr. 13, 2011) for U.S. Appl. No. 12/341,087, filed Dec. 22, 2008.
Amendment filed Jun. 8, 2011 in response to Final Office Action (dated Apr. 13, 2011) for U.S. Appl. No. 12/341,087, filed Dec. 22, 2008.
Notice of Allowance (dated Jun. 29, 2011) for U.S. Appl. No. 12/341,087, filed Dec. 22, 2008.
Office Action (dated Sep. 30, 2011) for U.S. Appl. No. 12/336,754; filed Dec. 17, 2008.
Amendment filed Dec. 22, 2011 in response to Office Action (dated Sep. 30, 2011) for U.S. Appl. No. 12/336,754, filed Dec. 17, 2008.
Notice of Allowance (dated Jan. 24, 2012) for U.S. Appl. No. 12/336,754, filed Dec. 17, 2008.
Request for Continued Examination filed Apr. 4, 2012 for U.S. Appl. No. 12/578,653, filed Oct. 14, 2009.
Piguet et al.; Extremely Low-Power Logic; Proceedings of the Design, Automation and Test in Europe Conference and Exhibition 2004 IEEE; 6 pages.
Xu et al.; A Serializability Violation Detector for Shared-Memory Server Programs; PLDI'05, Jun. 12-15, 2005, Chicago, Illinois, USA; 14 pages.
Holmes, Tiffany; Eco-Visualization: Combining Art and Technology to Reduce Energy Consumption; C&C'07, Jun. 13-15, 2007, Washington, DC, USA; pp. 153-162.
Carr, Brian; Fuel Economy Tip—Tailgating Doesn't Help; Daily Fuel Economy Tip; May 27, 2006; [retrieved on Jan. 5, 2012]. Retrieved from the Internet: URL: http://www.dailyfueleconomytip.com/driving-habits/fuel-economy-tip-tailgating-doesnt-help/; 6 pages.
Yglesias, Matt; I-95 Express Lane Pricing; Apr. 23,2011; URL http://counterpolitics.com/tag/toll-roads; retrieved from the Internet Jan. 12, 2012; 4 pages.
Tomaz et al.; TRA; Modeling the spatial parameters for dynamic road pricing; Transport Research Arena Europe 2008, Ljubljana; 7 pages.
Aman et al.; Evaluation of Congestion Pricing for Management Highway in Seattle; Systems and Information Engineering Design Symposium; Apr. 24, 2009; pp. 258-263 pages.
Electronic Tolling/Congestion Pricing; U.S. Department of Transportation Federal Highway Administration [online]; retrieved from the Internet URL: http://www.etc.dot.gov/congestion_pricing.htm; [retrieved on Sep. 1, 2009]; 4 pages.
Mobile Prompts for Detours Help Reduce Commute Time for Drivers [online]; AT&T News Release; San Antonio, Texas, Jun. 7, 2007; [retrieved on Feb. 28, 20120]. Retrieved from the Internet URL: http://www.att.com/gen/press-room?pid=4800&cdvn=news&newsarticleid=23918; 2 pages.
Whoriskey, Peter; Beating Traffic by Joining the Network [online]; [retrieved on Feb. 28, 2012]. Retrieved from the Internet URL: http://www.washingtonpost.com/wp-dyn/content/story/2008/03/24/ST2008032403495.html; 2 pages.
Get out of the jam: Avoid traffic with TeleNav GPS Navigator [online]; [retrieved on Feb. 28, 2012]. Retrieved from the Internet URL: http://www.telenav.com/products/tn/traffic.html; 2 pages.

(56) References Cited

OTHER PUBLICATIONS

Capturing traffic data using GPS-enabled cell phones; Machines Like Us Blog [online]; originally posted Feb. 10, 2008 [retrieved on Feb. 28, 2012]. Retrieved from the Internet URL: http://web.archive.org/web/20081013102040/http://www.machineslikeus.com/cms/capturing-traffic-data-using-GPS-enabled-cell-phones.html; 6 pages.

Method for Dynamic Road Status Information Conveyance Under Inclement Conditions; IBM; IP.com Technical Disclosure; IPCOM000177535D; Dec. 17, 2008; 5 pages.

Vehicle Route Planning Based on Real-Time Pollution Monitoring; IBM; IP.com Technical Disclosure; IPCOM000175555D; Oct. 13, 2008; 3 pages.

Dynamic Routing Based on Restricted Area and Policies; IBM; IP.com Technical Disclosure; IPCOM000177536D; Dec. 17, 2008; 5 pages.

Techno junkies meet plow truck operators for safety, security and keeping the honest man, you know, honest; Snowplow News [online]; [retrieved on Feb. 29,2012]. Retrieved from the Internet URL: http://web.archive.org/web/20081226183017/http://www.snowplownews.com/location-commun.html; 2 pages.

Super-powerful traffic and travel info; Virginia Department of Transportation; 2010 [online]; [retrieved on Feb. 29, 2012]. Retrieved from the Internet URL: http://www.511virginia.org/Default.aspx?r=1; 1 page.

Method for Construction-Induced Pollution Amelioration via Carbon Offset; IBM; IP.com Technical Disclosure IPCOM000183626D; May 29, 2009; 7 pages.

Amendment and Request for Continued Examination filed Mar. 25, 2015 in response to Patent Board Decision—Examiner Affirmed (Mail Date Jan. 29, 2015) for U.S. Appl. No. 12/336,587, filed Dec. 17, 2008.

U.S. Appl. No. 15/813,307, filed Nov. 15, 2017.

\* cited by examiner

DETERMINING A TRAVEL ROUTE

This application is a divisional application claiming priority to Ser. No. 12/578,780 filed Oct. 14, 2009, now abandoned.

The present invention relates to a data processing method and system for providing a location preference in a routing algorithm, and more particularly to technique for determining travel routes that include locations as a result of auctions.

BACKGROUND OF THE INVENTION

With an increased use of Global Positioning System (GPS) units to determine travel routes, travelers are following routes recommended to them, rather than using maps or following familiar paths. Conventional route planning systems determine optimal routes based on different preferred conditions, including minimizing travel time or minimizing the distance traveled. By focusing on optimal route determination, known route planning systems fail to consider non-optimal routes whose presentation to travelers may have value to other parties. Further, the conventional route planning systems fail to account for a dynamic market value associated with presenting a route to a traveler. Thus, there exists a need to overcome at least one of the preceding deficiencies and limitations of the related art.

SUMMARY OF THE INVENTION

In one or more embodiments, the present invention provides a computer-implemented method of determining a route that includes a location as a result of an auction. The method comprises:

receiving a request from a user for a determination of a route from a first point to a second point;

selecting a plurality of locations capable of being included along a plurality of routes from the first point to the second point, wherein the selecting the plurality of locations is based on the request;

initiating an auction among a plurality of vendors that submits a plurality of bids in the auction, wherein the vendors and the bids are associated in a one-to-one correspondence;

determining that a vendor of the plurality of vendors wins the auction based on a bid of the plurality of bids, wherein the bid is associated with the vendor;

a processor of a computer system determining the route so that a location of the plurality of locations is included along the route, wherein the location is associated with the vendor that wins the auction based on the bid; and presenting the determined route to the user as the recommended route.

A system, program product and process for supporting computing infrastructure corresponding to the above-summarized method is also described and claimed herein.

The present invention provides a technique for presenting travel routes to travelers, where the routes are generated so as to include locations associated with vendors that submit winning bids in auctions.

DETAILED DESCRIPTION OF THE INVENTION

Overview

Embodiments of the present invention provide a preference for a given route to pass by a particular location, based on an auction. Multiple vendors and/or other entities bid in an auction to ensure that a route recommended to a user (i.e., traveler) passes by a particular location associated with the winning bidder (i.e., the vendor or other entity that submits the winning bid). In one embodiment, a route calculation service utilizes an algorithm that takes into account a user's profile information to determine the particular vendors and/or other entities that are permitted to bid in an auction to determine a travel route. In another embodiment, additional route generation rules may be applied to determine whether the route determined by the auction is actually presented to a user as a recommended route.

System for Determining a Route by Using an Auction-Based Location Preference

Figure 1:
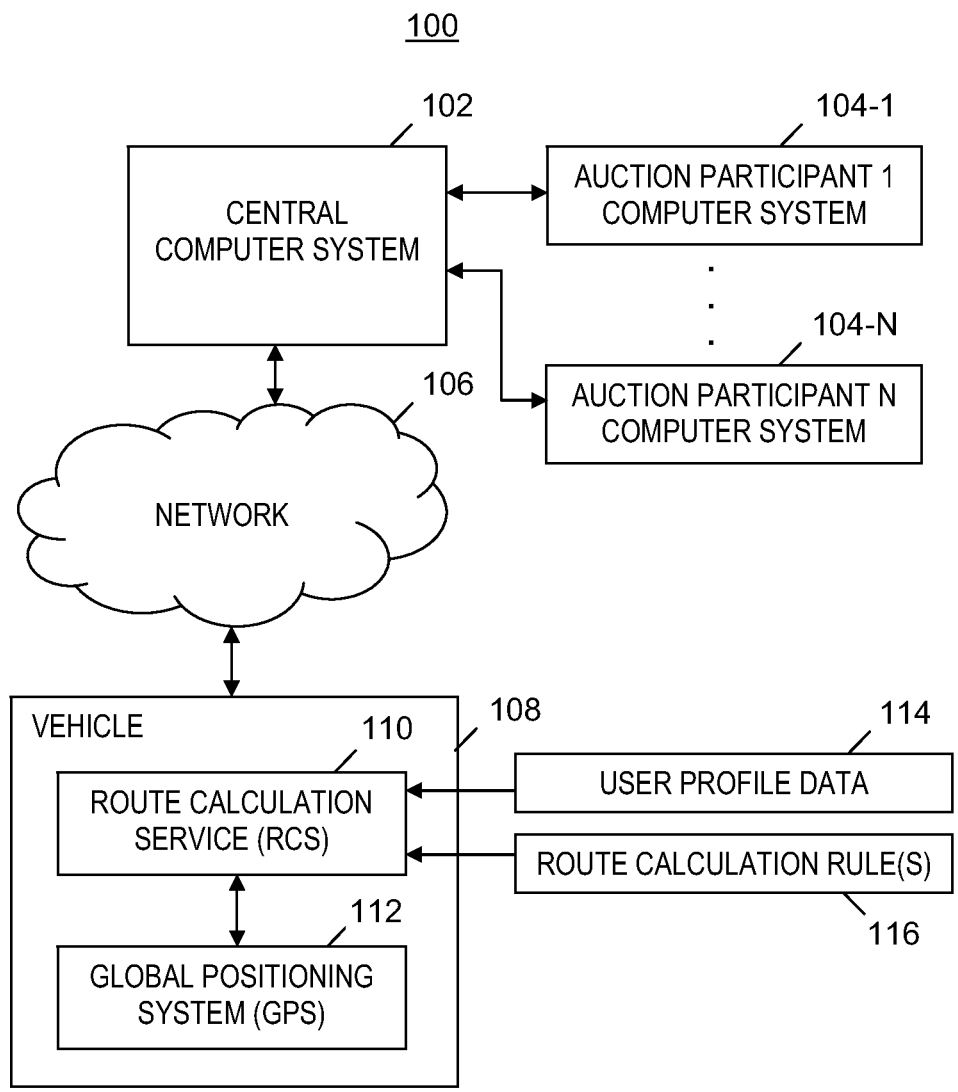
FIG. 1 is a block diagram of a system for determining a travel route that includes a location based on an auction, in accordance with embodiments of the present invention.

FIG. 1 is a block diagram of a system for determining a travel route that includes a location as a result of an auction won by a bid submitted by a vendor associated with the location, in accordance with embodiments of the present invention. As used herein, an auction has multiple vendors and/or other entities submitting bids for determining a route that includes a location associated with the winning bidder. The vendor or other entity submitting a winning bid (e.g., the highest bid) ensures that a travel route recommended to a user passes by a location associated with the vendor or other entity that submitted the winning bid. System 100 includes a central computer system 102, computer systems 104-1 . . . 104-N of auction participants 1 . . . N (i.e., vendors and/or other entities), a network 106, and a vehicle 108 that includes a software-implemented route calculation service (RCS) 110 and optionally a global positioning system (GPS) 112. System 100 may also include optional user profile data 114 and one or more optional route calculation rules 116. User profile data 114 and route calculation rules 116 may be stored in one or more computer data storage units coupled to central computer system 102 or coupled to a data processing unit (e.g., GPS 112) residing in vehicle 108.

Computer systems 104-1 . . . 104-N are managed by auction participants 1 . . . N, respectively, where N≥1. The auction participants 1 . . . N are herein also referred to as vendors 1 . . . N. The present invention contemplates that the vendors 1 . . . N may include one or more businesses and/or one or more other types of organizational entities. Via a network (not shown), computer systems 104-1 . . . 104-N send identifications of vendors 1 . . . N and identifications of multiple locations to central computer system 102 to indicate that vendors 1 . . . N may participate in an auction-based location preference system managed by central computer system 102. Each vendor in vendors 1 . . . N is associated with one or more locations of the aforementioned multiple locations. For example, if Vendor 1 is associated with Location 1 and Vendor 1 is the owner of a grocery store, then Location 1 may be the site of the grocery store.

RCS 110 receives the identifications of the vendors 1 . . . N and the identifications of the multiple locations from central computer system 102 via network 106. RCS 110 determines a travel route that includes a location associated with a vendor included in vendors 1 . . . N, where the vendor submitted a winning bid in an auction. In one embodiment, the central computer system 102 receives indications from multiple route calculation services in multiple vehicles (e.g., route calculation service 110 in vehicle 108 and other route calculation services in other vehicles not shown in FIG. 1) of which vendors have submitted winning bids in auctions and notifies the vendor computer systems of computer systems 104-1 . . . 104-N that are managed by the vendors who submitted winning bids. The determination of the travel route may also be based on user profile data 114 and/or route calculation rules 116. Further descriptions of the functionality of components of system 100 are found in the discussions below relative to FIGS. 2-6.

Processes for Determining a Route by Using An Auction-Based Location Preference

Figure 2:
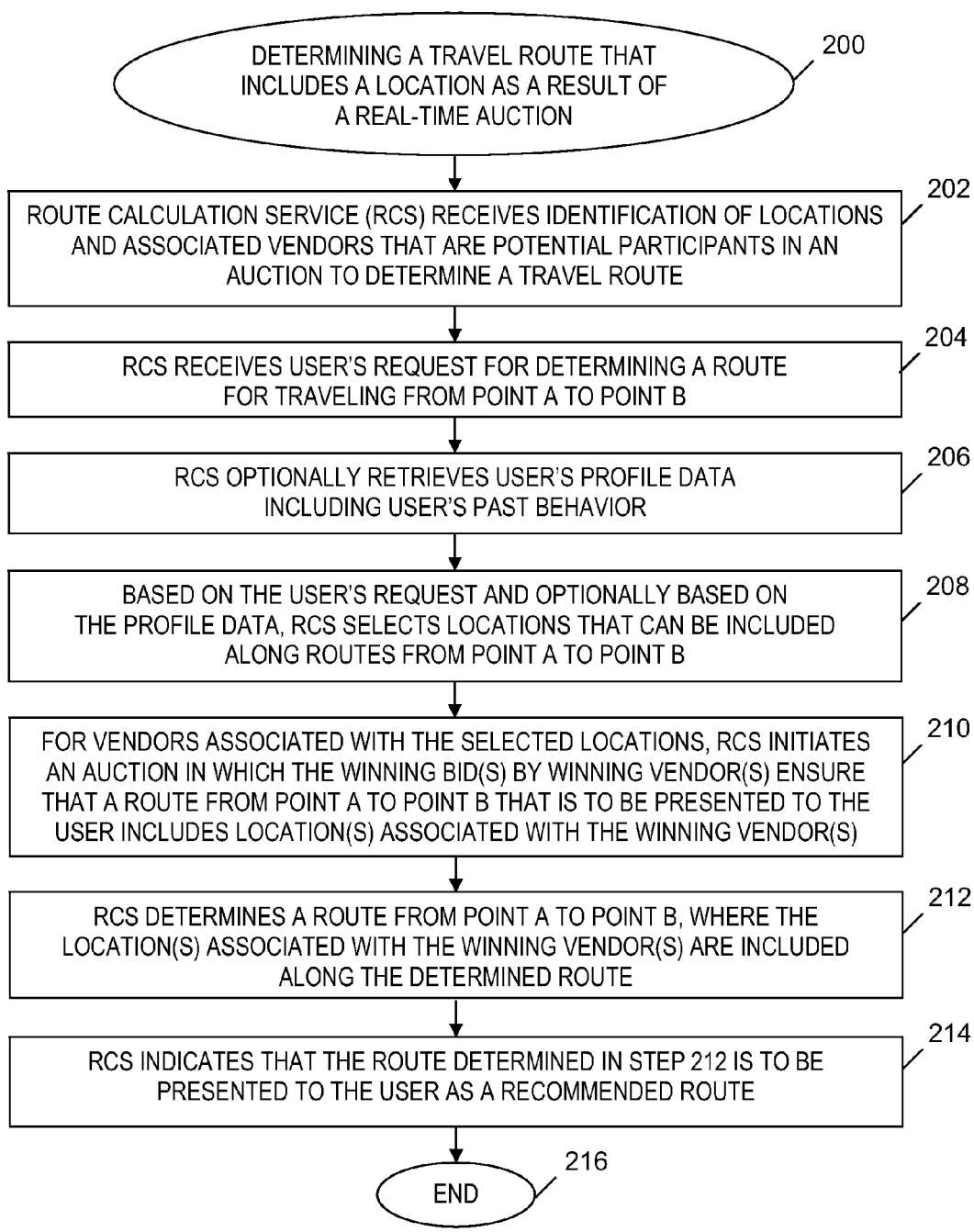
FIG. 2 is a flowchart of a process for determining a travel route in the system of FIG. 1, where the travel route includes a location as a result of a real-time auction, in accordance with embodiments of the present invention.

FIG. 2 is a flowchart of a process for determining a travel route in the system of FIG. 1, where the process includes a location in the travel route as a result of a real-time auction won by a bid submitted by a vendor associated with the location, in accordance with embodiments of the present invention. The process of determining a travel route by using a real-time auction in the system of FIG. 1 starts at step 200. In step 202, RCS 110 (see FIG. 1) receives identifications of vendor(s) and location(s) associated with the vendor(s), where the vendor(s) are potential participants in a real-time auction to determine a travel route. That is, RCS 110 (see FIG. 1) receives an identification of each vendor who may bid in a real-time auction to ensure that a location associated with the vendor is included in a travel route determined by the RCS. The location(s) are associated with the vendor(s) in a one-to-one correspondence. In one embodiment, the location associated with the vendor is a site (e.g., identified by address or geographic coordinates) at which the vendor conducts business.

In step 204, RCS 110 (see FIG. 1) receives a request issued by a user of GPS 112 (see FIG. 1) for a travel route for vehicle 108 (see FIG. 1) to travel from a first geographic location (a.k.a. point A, first point or starting point) to a second geographic location (a.k.a. point B, second point or ending point). The request received in step 204 may include, for example, the addresses or geographic coordinates of point A and point B.

In step 206, RCS 110 (see FIG. 1) optionally retrieves user profile data from a computer data storage unit, where the user profile data describes the user who issued the request in step 204. The user profile data includes data describing the user's past behavior and may also include predicted future behavior of the user. The user profile data may include one or more preferences that a user has for purchasing one or more particular goods and/or one or more particular services, where the preference(s) may be based on, for example, past purchases made by the user and/or user-specified selections of goods and/or services.

In step 208, based on the request received in step 204 and based on user profile data if user profile data is retrieved in step 206, RCS 110 (see FIG. 1) selects a plurality of locations of the locations whose identifications are received in step 202. A routing algorithm implemented by RCS 110 (see FIG. 1) can include one or more locations of the plurality of locations selected in step 208 along a route that conforms to the request received in step 204. As used herein, a location included along a route is defined as a location that is located at an address on a segment of the route or is located at a nearest distance to the route where the nearest distance does not exceed a predefined distance or a user-specified distance. A location included along a route is further defined to be not the starting point of the route and not the ending point of the route.

In step 210, for vendors associated with the locations selected in step 208, RCS 110 (see FIG. 1) initiates an auction. The auction is conducted by central computer system 102 (see FIG. 1) to determine winning bid(s) and the vendor(s) (i.e., winning vendor(s)) that submit the winning bid(s). The winning bid(s) by winning vendor(s) ensure that a route from point A to point B that is to be presented to the user includes location(s) associated with the winning vendor(s). In one embodiment, the central computer system determines a winning bid as being the highest-valued bid in the auction. In another embodiment, the central computer system determines multiple winning bids from multiple vendors, where the multiple vendors do not compete with each other in terms of the goods and/or services they offer according to predefined criteria.

In step 212, RCS 110 (see FIG. 1) determines a route from point A to point B that conforms to the request received in step 204 and that includes the location(s) associated with the winning vendor(s). The determination of the route in step 212 may also be based on user profile data optionally retrieved in step 206.

In one embodiment, RCS 110 (see FIG. 1) notifies the user if user profile data is a basis for the route determined in step 212. In another embodiment, the user is not notified if user profile data is a basis for the route determined in step 212.

In step 214, RCS 110 (see FIG. 1) instructs a data processing system (e.g., GPS 112 in FIG. 1) residing in vehicle 108 (see FIG. 1) that the route determined in step 212 is to be presented to the user as a recommended route. In response, the data processing system (e.g., GPS 112 in FIG. 1) presents (e.g., displays) the route determined in step 212 to the user as a recommended route. After the recommended route is presented and in response to the user traveling the recommended route and actually driving past a location associated with a winning vendor, an entity controlling the RCS, the user, and/or another party (e.g., a charitable organization) are compensated for their participation based on the amount bid by the winning vendor. The process of FIG. 2 ends at step 216.

In one embodiment, step 214 also includes the RCS notifying the user that the recommended route passes by the aforementioned location(s) and that the winning vendor(s) are associated with the location(s). The notification to the user may also include an identification of a category of goods and/or services provided by a winning vendor.

As an example of a portion of the process of FIG. 2, RCS 110 (see FIG. 1) receives a user's request for determining a route from point A to point B (see step 204). The RCS retrieves the user's profile data (see step 206), which indicates that the user likes luxury automobiles. Based on the user's request and the retrieved profile data that indicates that user likes luxury automobiles, the RCS selects Location 1 (i.e., the location of Dealer X) and Location 2 (i.e., the location of Dealer Y), where Dealer X and Dealer Y are luxury automobile dealers (see step 208). Location 1 or Location 2 may be included along a route from point A to point B, where the route is to be determined by the RCS. The RCS invites Dealer X and Dealer Y to participate in an auction (e.g., via web services) to ensure that the route to be determined passes by Location 1 if Dealer X wins the auction or Location 2 if Dealer Y wins the auction (see step 210). In the auction, Dealer X bids $1.10 to ensure that the route passes by Location 1 and Dealer Y bids $1.05 to ensure that the route passes by Location 2. Since Dealer X's bid amount is greater than Dealer Y's bid amount, Dealer X wins the auction and RCS determines a route from point A to point B that passes by Location 1. The RCS directs a system in the vehicle of the user to display the determined route from point A to point B as a recommended route (see step 214). The RCS notifies the user that the recommended route passes by Location 1 and that Location 1 is associated with Dealer X. After the user takes the recommended route and actually drives past Location 1, an entity controlling the RCS and the user are paid for their participation based on the amount bid by Dealer X in the auction.

In a variation of the example presented above with Dealer X and Dealer Y participating in an auction, multiple routes from point A to point B (including the recommended route) are presented to the user and the user is compensated (e.g., with a credit to an account) in response to the user selecting the recommended route instead of the other presented routes.

In another example, a user requests a route from point A to point B (see step 204) and the user's profile data indicates a preference for luxury automobiles and for visiting coffee shops (see step 206). The auction (see step 210) accepts bids from a first set of luxury automobile dealer vendors and bids from a second set of coffee shop vendors. The result of the auction is that Luxury Automobile Dealer 1 (i.e., the luxury automobile dealer that submitted the highest bid among the first set of vendors) is a first winning vendor and Coffee Shop 1 (i.e., the coffee shop vendor that submitted the highest bid among the second set of vendors) is a second winning vendor. The RCS determines a route from point A to point B (see step 212) that includes Location 1 and Location 2, where Location 1 is the site at which Luxury Automobile Dealer 1 conducts business and where Location 2 is the site of Coffee Shop 1.

Figure 3:
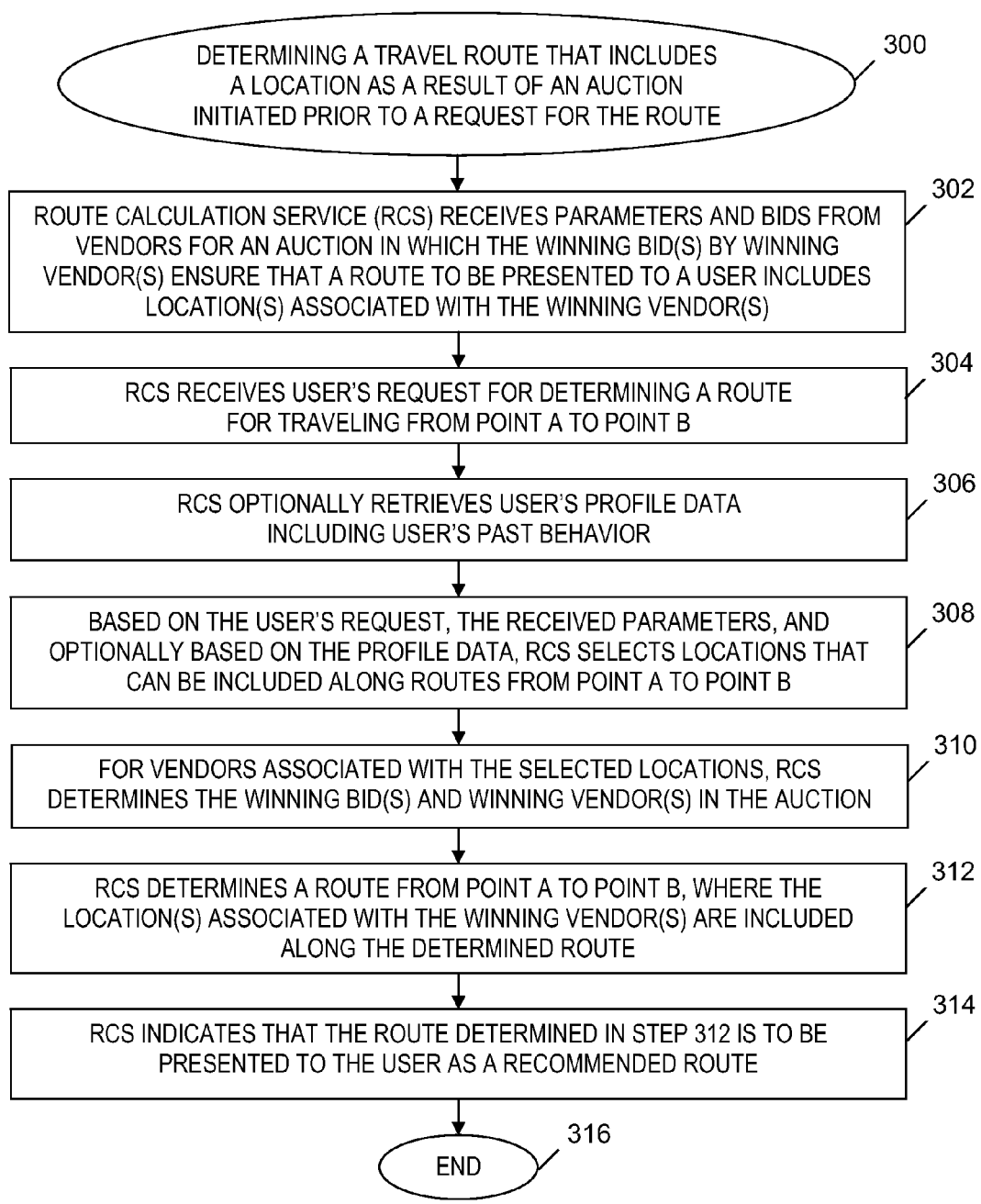
FIG. 3 is a flowchart of a process for determining a travel route in the system of FIG. 1, where the travel route includes a location as a result of an auction initiated prior to a request for the travel route, in accordance with embodiments of the present invention.

FIG. 3 is a flowchart of a process for determining a travel route in the system of FIG. 1, where the process includes a location in the travel route as a result of an auction initiated prior to receiving a request for determining the route (a.k.a. an ahead-of-time auction), in accordance with embodiments of the present invention. The process of determining a travel route by using an ahead-of-time auction in the system of FIG. 1 starts at step 300. In step 302, RCS 110 (see FIG. 1) receives parameters from vendors and bids from vendors for an auction in which the winning bid(s) submitted by winning vendor(s) ensure that a route to be presented to a user includes location(s) associated with the winning vendor(s). The location(s) are associated with the vendor(s) in a one-to-one correspondence. In one embodiment, the location associated with the vendor is a site (e.g., identified by an address or geographic coordinates) at which the vendor conducts business.

One or more parameters received in step 302 may specify how a particular vendor's bid in the auction varies based on predefined criteria. For example, parameters may specify how a vendor's bid varies by: the time of day at which the route is requested, the value of a particular customer based on the customer's past behavior (e.g., past purchases) or predicted future behavior in the user profile data, and/or events that occurred (or will occur) within a specified time period in an area through which a requested route passes.

One or more parameters received in step 302 may specify a pre-cached auction bid. Multiple vendors may submit pre-cached auction bids that allow the auction to be conducted instantaneously (see step 310) in response to receiving the user's request for a route from point A to point B (see step 304) and selecting locations that can be included along routes from point A to point B (see step 308). In one embodiment, the parameter(s) specifying a pre-cached auction bid by a vendor includes the vendor's maximum bid amount for auctions to be conducted. In another embodiment, the parameters include X and N, where the vendor's maximum pre-cached auction bid amount X is submitted for N auctions. In still another embodiment, the parameters include X, N and T, where the vendor's maximum pre-cached auction bid amount X is submitted for N auctions, where there is not less than T time units between successive auctions. For example, a vendor may specify parameters that indicate the vendor is willing to bid up to $1.20 20 times for auctions where successive auctions are not less than 20 minutes apart.

In step 304, RCS 110 (see FIG. 1) receives a request issued by a user of GPS 112 (see FIG. 1) for a travel route for vehicle 108 (see FIG. 1) to travel from a first geographic location (a.k.a. point A, first point or starting point) to a second geographic location (a.k.a. point B, second point or ending point). The request received in step 304 may include, for example, the addresses or geographic coordinates of point A and point B.

In step 306, RCS 110 (see FIG. 1) optionally retrieves user profile data from a computer data storage unit, where the user profile data describes the user who issued the request in step 304. The user profile data includes data describing the user's past behavior and may also include predicted future behavior of the user. The user profile data may include one or more preferences that a user has for purchasing one or more particular goods and/or one or more particular services, where the preference(s) may be based on, for example, past purchases made by the user and/or user-specified selections of goods and/or services.

In step 308, based on the request received in step 304, the parameters received in step 302, and the user profile data if the user profile data is retrieved in step 306, RCS 110 (see FIG. 1) selects a plurality of locations of the locations associated with the vendors whose bids are received in step 302. A routing algorithm implemented by RCS 110 (see FIG. 1) can include one or more locations of the plurality of locations selected in step 308 along a route that conforms to the request received in step 304.

In step 310, for vendors associated with the locations selected in step 308, RCS 110 (see FIG. 1) completes the auction by determining the winning bid(s) and the winning vendor(s) that submit the winning bid(s) in the auction. The winning bid(s) by winning vendor(s) ensure that a route from point A to point B that is to be presented to the user includes location(s) associated with the winning vendor(s).

In step 312, RCS 110 (see FIG. 1) determines a route from point A to point B that conforms to the request received in step 304 and that includes the location(s) associated with the winning vendor(s). The determination of the route in step 312 may also be based on user profile data optionally retrieved in step 306.

In one embodiment, RCS 110 (see FIG. 1) notifies the user if user profile data is a basis for the route determined in step 312. In another embodiment, the user is not notified if user profile data is a basis for the route determined in step 312.

In step 314, RCS 110 (see FIG. 1) instructs a data processing system (e.g., GPS 112 in FIG. 1) residing in vehicle 108 (see FIG. 1) that the route determined in step 312 is to be presented to the user as a recommended route. In response, the data processing system (e.g., GPS 112 in FIG. 1) presents (e.g., displays) the route determined in step 312 to the user as a recommended route. After the recommended route is presented and in response to the user traveling the recommended route and actually driving past a location associated with a winning vendor, an entity controlling the RCS, the user, and/or another party (e.g., a charitable organization) are compensated for their participation based on the amount bid by the winning vendor. The process of FIG. 3 ends at step 316.

In one embodiment, step 314 also includes the RCS notifying the user that the recommended route passes by the aforementioned location(s) and that the winning vendor(s) are associated with the location(s). The notification to the user may also include an identification of a category of goods and/or services provided by a winning vendor.

In an alternate embodiment, instead of having the RCS 110 (see FIG. 1) push a route, a user may pull a route based on explicit user profile data items being specified for a particular trip event that requires a travel route to be determined and recommended. For example, the user may specify a distance over and above the length of the shortest route that the user is willing to travel. As another example, the user may specify service(s) and/or product(s) (e.g., grocery store) the user would like to travel near during a given trip. The route determined in step 212 (see FIG. 2) or in step 312 may include location(s) selected in step 208 (see FIG. 2) or step 308, respectively, where the location(s) are selected because they provide the service(s) and/or product(s) specified by the user.

Possible methods for funding and providing incentives for the processes in FIG. 2 and FIG. 3 may include:
1. Based on the winning bid, a fee is charged to the winning vendor whose location is included in the recommended route and the user who is a customer of the vendor is not compensated.
2. The user (i.e., the customer of the winning vendor whose location is included in the recommended route) is compensated directly (e.g., with cash, reimbursements for tolls incurred along the route, credits for spending at the vendor's store, etc.).
3. Compensation may optionally be given to nonprofit causes, including charities or green initiatives.

Additional Fee Based on Actual Route Taken

Figure 4:
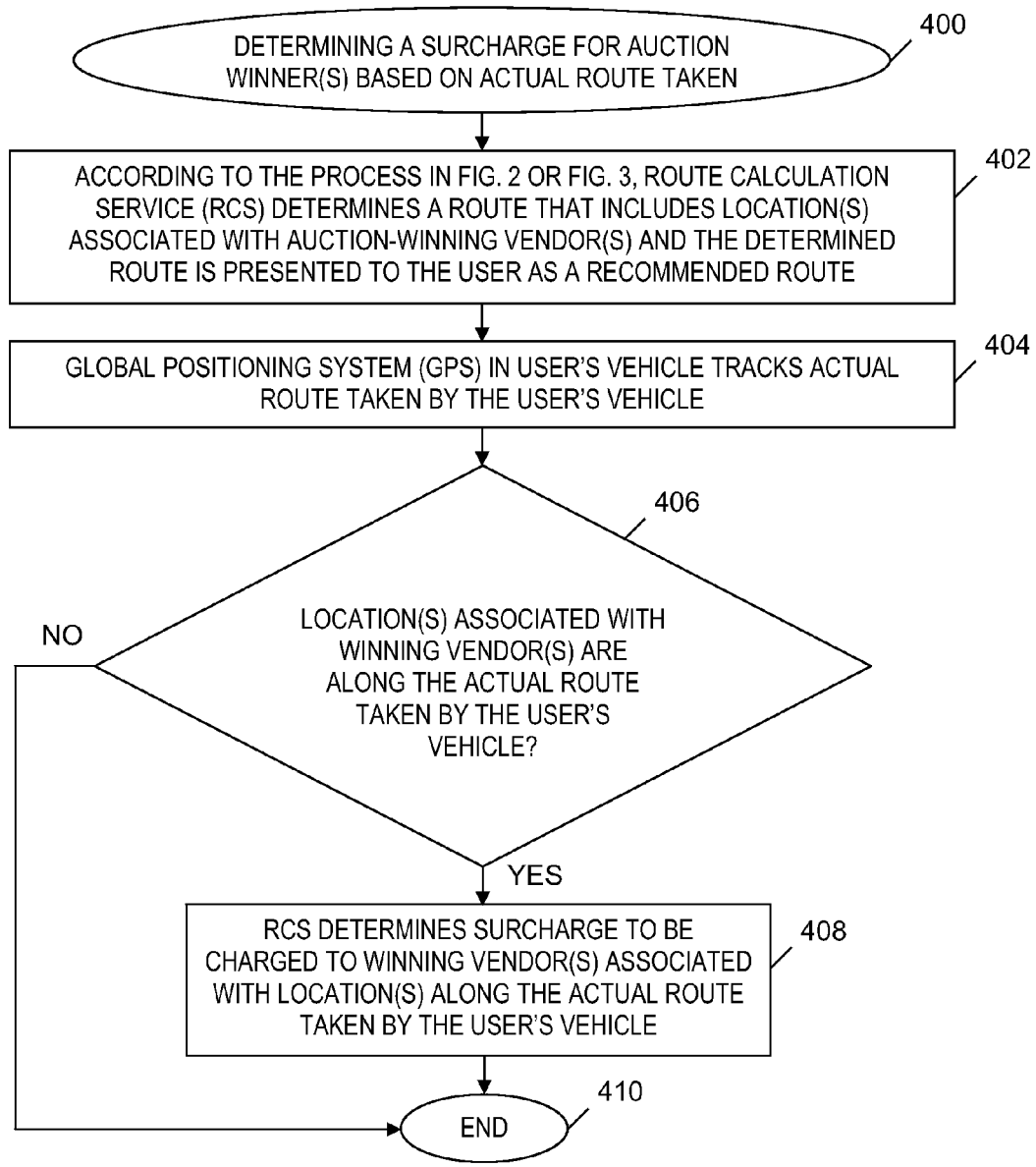
FIG. 4 is a flowchart of a process that determines a route according to the process of FIG. 2 or FIG. 3 and that determines additional fee(s) for auction winner(s) based on an actual route taken, in accordance with embodiments of the present invention.

FIG. 4 is a flowchart of a process for determining a surcharge based on an actual route taken subsequent to a presentation of a recommended route in the process of FIG. 2 or FIG. 3, in accordance with embodiments of the present invention. The surcharge determination process of FIG. 4 starts at step 400. In step 402, by performing the steps of the process of FIG. 2 or FIG. 3, RCS 110 (see FIG. 1) determines a travel route that includes location(s) associated with winning vendor(s) and the determined travel route is presented to the user as a recommended route.

In step 404, GPS 112 (see FIG. 1) located in the user's vehicle 108 (see FIG. 1) tracks the actual route taken by the user's vehicle.

In step 406, RCS 110 (see FIG. 1) determines whether one or more locations that are included in the recommended route and that are associated with one or more winning vendor(s) are included in the actual route traveled by the user in vehicle 108 (see FIG. 1). In one embodiment, step 406 includes RCS 110 (see FIG. 1) determining whether the actual route traveled by vehicle 108 (see FIG. 1) is the recommended route determined in step 402.

If step 406 determines that location(s) associated with winning vendor(s) are located along the actual route taken by vehicle 108 (see FIG. 1), then in step 408 RCS 110 (see FIG. 1) determines surcharge(s) to be charged to the winning vendor(s) associated with the location(s) that are along the actual route taken by the user's vehicle. For example, if Vendor 1 is a winning vendor that had bid X in the auction initiated in step 210 (see FIG. 2) or step 302 (see FIG. 3) and a surcharge determined in step 408 to be charged to Vendor 1 is S, then Vendor 1 pays X+S as a result of Vendor 1 winning the auction and the user's vehicle traveling an actual route that includes the location associated with Vendor 1.

Different vendors may be charged the same or different surcharges, where the surcharges are determined in step 408.

Following step 408, the process of FIG. 4 ends at step 410. Returning to step 406, if RCS 110 (see FIG. 1) determines that no location(s) associated with the winning vendor(s) are along the actual route taken by vehicle 108 (see FIG. 1), then the process of FIG. 4 ends at step 410.

Rule-Based Route Determination

A rule-based route determination process determines a route according to the process of FIG. 2 through step 212 or the process of FIG. 3 through step 312, and indicates whether or not the determined route is a recommended route based on the application of a predefined route calculation rule (i.e., based on whether a measurement of the determined route satisfies a predefined rule). One or more route calculation rules 116 (see FIG. 1) are received and stored in a computer data storage unit. The computer data storage unit may be coupled to GPS 112 (see FIG. 1) or computer system 102 (see FIG. 1). The received route calculation rule(s) 116 (see FIG. 1) indicate that one or more measurements of a recommended route from point A to point B presented in the process of FIG. 2 or FIG. 3 are not permitted to differ from one or more corresponding measurements of an optimal route from point A to point B by more than one or more corresponding predefined threshold values. The difference between the measurement of a recommended route and the corresponding measurement of the optimal route, and the corresponding predefined threshold value may be expressed as a number of units of the measurement, a percentage, or a ratio.

Figure 5:
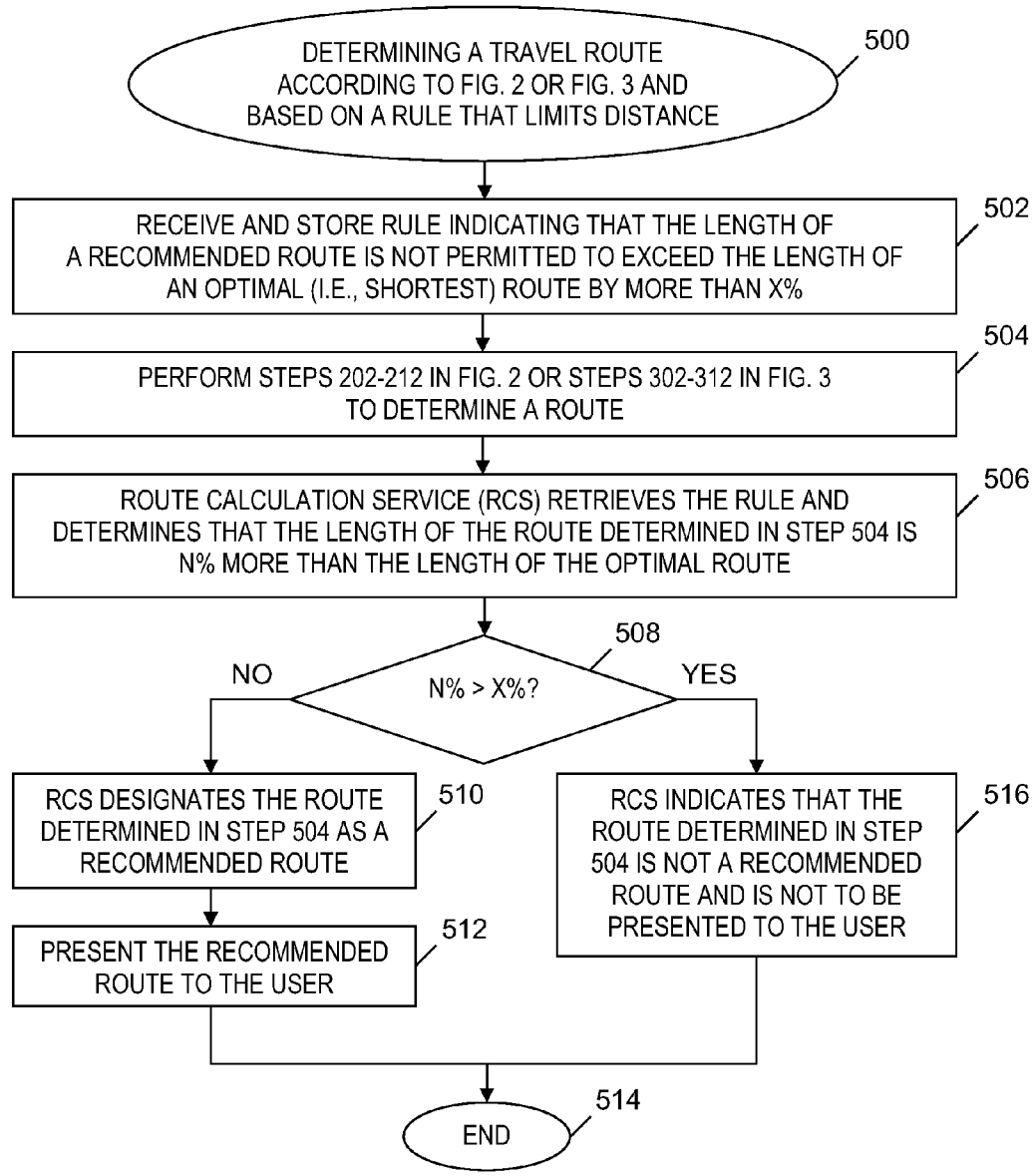
FIG. 5 is a flowchart of a process that determines a travel route according to the process of FIG. 2 or FIG. 3 and based on a rule that limits distance, in accordance with embodiments of the present invention.

One rule 116 may indicate that the distance of a recommended route must not exceed a distance of a shortest-distance route from point A to point B by more than X % or by more than a distance of X units (e.g., X miles), where X is a predefined value (see the discussion of FIG. 5 presented below). Another rule 116 may indicate that the time for traveling the recommended route from point A to point B must not exceed a time for traveling the shortest-time route from point A to point B by more than X % or by more than a time of X units (e.g., X minutes), where X is a predefined value.

In the rule-based route determination process, RCS 110 (see FIG. 1) retrieves a rule 116 from the aforementioned computer data storage unit, where the rule states that in order for a determined route to be a recommended route, the difference N between a measurement of the determined route and a corresponding measurement of an optimal route must not exceed threshold value X. The optimal route is the route that is optimized according to the corresponding measurement.

If RCS 110 (see FIG. 1) determines the difference N is not greater than threshold value X, then the RCS designates the determined route to be a recommended route, the GPS 112 (see FIG. 1) presents (e.g., displays) the recommended route to the user, and the rule-based route determination process ends.

If RCS 110 (see FIG. 1) determines that the difference N is greater than the threshold value X, then the RCS indicates that the determined route is not a recommended route and is not to be presented to the user and the rule-based route determination process ends.

In one embodiment, the rule-based route determination process utilizes a distance limiting rule, as described below relative to FIG. 5.

Rule Limiting the Distance of a Recommended Route

FIG. 5 is a flowchart of a process for determining a travel route according to the process of FIG. 2 or FIG. 3 and based on a rule that limits the distance of the recommended route, in accordance with embodiments of the present invention. The process of FIG. 5 begins at step 500. In step 502, one or more route calculation rules 116 (see FIG. 1) are received and stored in a computer data storage unit. The computer data storage unit may be coupled to GPS 112 (see FIG. 1) or computer system 102 (see FIG. 1). The received route calculation rule(s) 116 (see FIG. 1) include a distance-limiting rule that indicates that the length of a recommended route from point A to point B presented in the process of FIG. 2 or FIG. 3 is not permitted to exceed the length of an optimal (i.e., shortest) route from point A to point B by more than X %.

In step 504, steps 202-212 (see FIG. 2) or steps 302-312 (see FIG. 3) are performed by RCS 110 (see FIG. 1) to determine a route from point A to point B.

In step 506, RCS 110 (see FIG. 1) retrieves the distance-limiting rule from the aforementioned computer data storage unit. Also in step 506, RCS 110 (see FIG. 1) determines that the length of the route determined in step 504 is N % more than the length of the optimal route from point A to point B.

If RCS 110 (see FIG. 1) determines in step 508 that N % is not greater than X %, then the No branch of step 508 is taken and step 510 is performed. In step 510, RCS 110 (see FIG. 1) designates the route determined in step 504 as a recommended route. In step 512, the GPS 112 (see FIG. 1) presents (e.g., displays) the recommended route to the user. The process of FIG. 5 ends at step 514.

Returning to step 508, if RCS 110 (see FIG. 1) determines that N % is greater than X %, then in step 516 the RCS indicates that the route determined in step 504 is not a recommended route and is not to be presented to the user. Following step 516, the process of FIG. 5 ends at step 514.

In an alternate embodiment, the rule received in step 502 indicates that the length of the recommended route is not permitted to exceed the length of the optimal route by more than a distance X (e.g., X miles) and step 506 determines that the length of the route determined in step 504 is a distance N longer than the length of the optimal route. Furthermore, in this alternate embodiment, step 508 determines whether N>X.

Rule Limiting the Number of Recommended Routes

Figure 6:
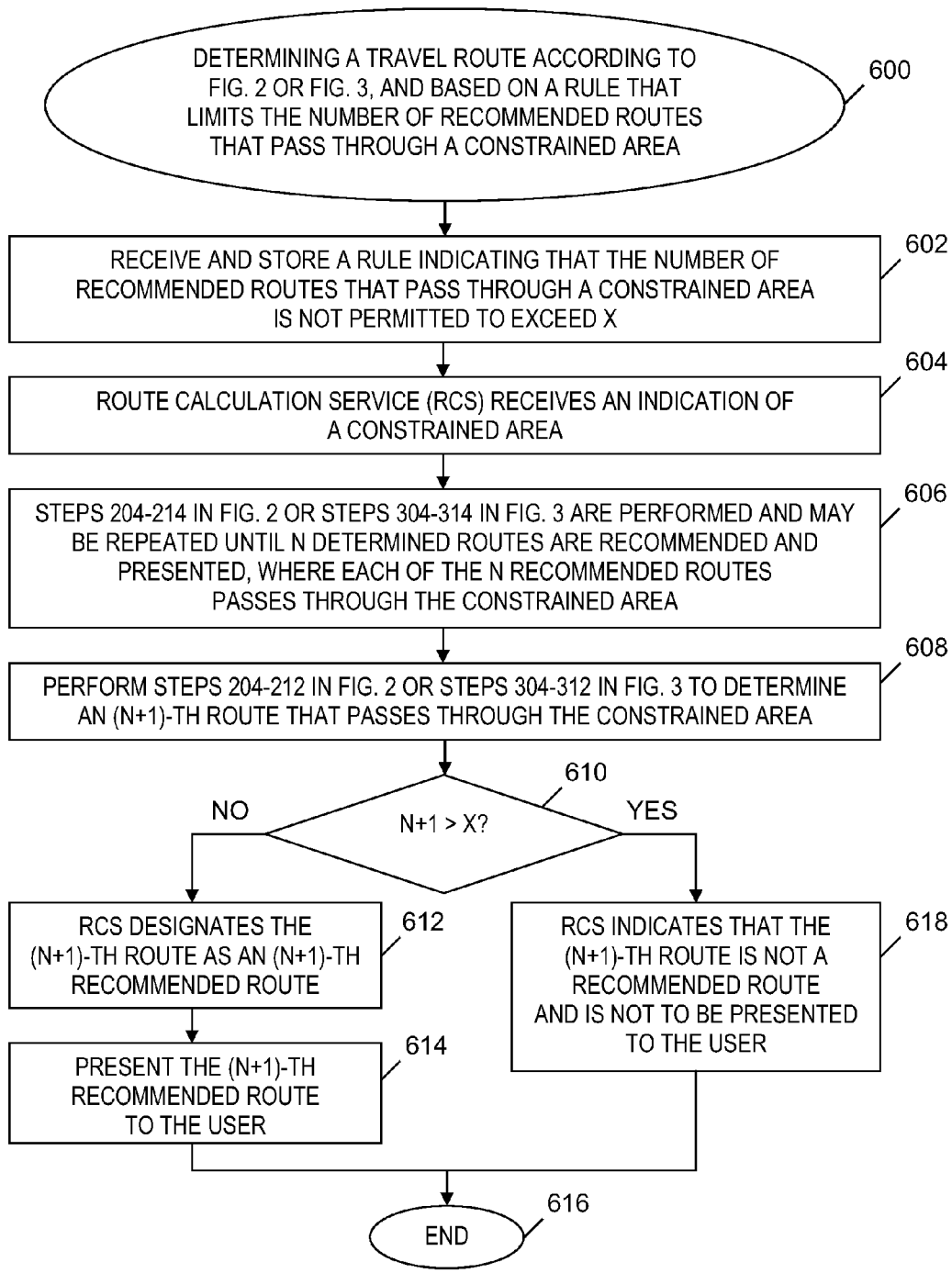
FIG. 6 is a flowchart of a process that determines a travel route according to the process of FIG. 2 or FIG. 3 and based on a rule that limits the number of recommended routes that pass through a constrained area, in accordance with embodiments of the present invention.

FIG. 6 is a flowchart of a process for determining a travel route according to the process of FIG. 2 or FIG. 3 and based on a rule that limits the number of recommended routes that pass through a constrained area. The process of FIG. 6 starts at step 600. In step 602, one or more route calculation rules 116 (see FIG. 1) are received and stored in a computer data storage unit. The computer data storage unit may be coupled to GPS 112 (see FIG. 1) or computer system 102 (see FIG. 1). The received route calculation rule(s) 116 (see FIG. 1) include a recommended routes quantity-limiting rule that indicates that the number of recommended routes presented by multiple performances of steps 204-214 (see FIG. 2) or steps 304-314 (see FIG. 3), where the recommended routes pass through a constrained area, is not permitted to exceed a predefined number X.

In step 604, RCS 110 (see FIG. 1) receives an indication of an area (a.k.a. constrained area) that is constrained according to predefined criteria.

In step 606, the steps 204-214 (see FIG. 2) or steps 304-314 (see FIG. 3) are performed and may be repeated until N routes determined by step 212 (see FIG. 2) or step 312 (see FIG. 3) are recommended and presented in step 214 (see FIG. 2) or step 314 (see FIG. 3), where N≥1, and where each of the N recommended routes pass through the constrained area indicated in step 604.

In step 608, steps 204-212 (see FIG. 2) or steps 304-312 (see FIG. 3) are performed to determine an (N+1)-th route that passes through the constrained area whose indication is received in step 604.

If RCS 110 (see FIG. 1) determines in step 610 that N+1 is not greater than X, then the No branch of step 610 is taken and step 612 is performed. In step 612, RCS 110 (see FIG. 1) designates the (N+1)-th route determined in step 608 as the (N+1)-th recommended route. In step 614, the GPS 112 (see FIG. 1) presents (e.g., displays) the (N+1)-th recommended route to the user. The process of FIG. 6 ends at step 616.

Returning to step 610, if RCS 110 (see FIG. 1) determines that N+1 is greater than X, then in step 618 the RCS indicates that the (N+1)-th route determined in step 608 is not a recommended route and is not to be presented to the user. In one embodiment, step 618 indicates that the (N+1)-th route is not a recommended route and is not to be presented to the user in order to prevent a traffic jam in the constrained area. Following step 618, the process of FIG. 6 ends at step 616.

In an alternate embodiment, step 618 is replaced with (1) the RCS 110 (see FIG. 1) identifying the constrained area as having congested traffic based on the N recommended routes previously presented to users (or based on an indication received by the RCS in a previous step), (2) the RCS determining that the (N+1)-th route passes through the area of congested traffic, and (3) the RCS determining a fee to charge a vendor whose associated location is along the (N+1)-th route. The fee is charged for proposing routes for any additional vehicles to travel through the congested area, thereby promoting environmental stewardship by potentially reducing the number of additional vehicles entering the congested area.

Computer System

Figure 7:
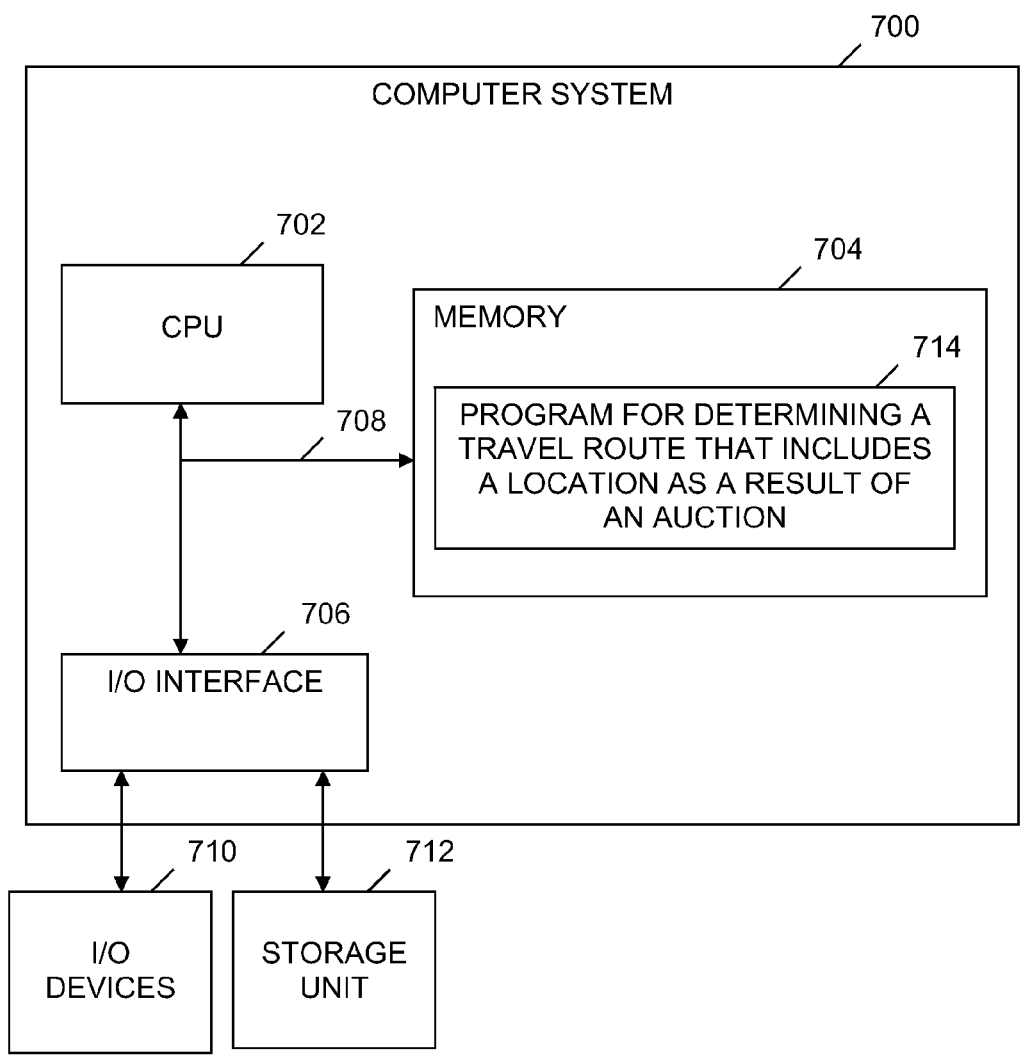
FIG. 7 is a block diagram of a computer system included in the system of FIG. 1 and that implements the process of FIG. 2 and/or the process of FIG. 3, in accordance with embodiments of the present invention.

FIG. 7 is a computer system that is included in the system of FIG. 1 and that implements the process of FIG. 2 and/or the process of FIG. 3, in accordance with embodiments of the present invention. Computer system 700 generally comprises a central processing unit (CPU) 702, a memory 704, an input/output (I/O) interface 706, and a bus 708. Further, computer system 700 is coupled to I/O devices 710 and a computer data storage unit 712. CPU 702 performs computation and control functions of computer system 700. CPU 702 may comprise a single processing unit, or be distributed across one or more processing units in one or more locations (e.g., on a client and server). In one embodiment, computer system 700 implements RCS 110 (see FIG. 1) and may reside in vehicle 108 (see FIG. 1). In one embodiment, computer system 700 is GPS 112 (see FIG. 1).

Memory 704 may comprise any known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 700, and may comprise any type of transmission link, including electrical, optical, wireless, etc.

I/O interface 706 also allows computer system 700 to store and retrieve information (e.g., data or program instructions such as program code 714) from an auxiliary storage device such as computer data storage unit 712 or another computer data storage unit (not shown). Computer data storage unit 712 may comprise any known computer readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 may include computer program code 714 that provides the logic for determining a travel route that includes a location as a result of an auction (e.g., the process of FIG. 2 or FIG. 3). Further, memory 704 may include other systems not shown in FIG. 7, such as an operating system (e.g., Linux) that runs on CPU 702 and provides control of various components within and/or connected to computer system 700.

Memory 704, storage unit 712, and/or one or more other computer data storage units (not shown) that are coupled to computer system 700 may store a database (e.g., central database 104 in FIG. 1). The database stored by storage unit 712 may include user profile data 114 (see FIG. 1) and/or route calculation rules 116 (see FIG. 1).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 700).

Furthermore, an embodiment of the present invention may take the form of a computer program product embodied in one or more computer readable medium(s) (e.g., memory 704 or computer data storage unit 712) having computer readable program code (e.g., program code 714) embodied or stored thereon.

Any combination of one or more computer readable medium(s) (e.g., memory 704 and computer data storage unit 712) may be utilized. The computer readable medium may be a computer readable signal medium or a computer readable storage medium. A computer readable storage medium may be, for example, but not limited to, an electronic, magnetic, optical, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with a system, apparatus, or device for carrying out instructions. The terms "computer readable storage medium" and "computer readable storage device" do not include signal propagation media such as copper cables, optical fibers and wireless transmission media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 714) embodied on a computer readable medium may be transmitted using any appropriate medium, including but not limited to wireless, wireline, optical fiber cable, RF, etc., or any suitable combination of the foregoing.

Computer program code (e.g., program code 714) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 700 or another computer system (not shown) having components analogous to the components of computer system 700 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2-6) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714). These computer program instructions may be provided to a processor (e.g., CPU 702) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 704 or computer data storage unit 712) that can direct a computer (e.g., computer system 700), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 700), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of determining a travel route that includes a location as a result of an auction. Thus, an embodiment of the present invention discloses a process for supporting computer infrastructure, comprising integrating, hosting, maintaining and deploying computer-readable code (e.g., program code 714) into a computer system (e.g., computer system 700), wherein the code in combination with the computer system is capable of performing a process of determining a travel route that includes a location as a result of an auction.

In another embodiment, the invention provides a business method that performs the process steps of the invention on a subscription, advertising and/or fee basis. That is, a service provider, such as a Solution Integrator, can offer to create, maintain, support, etc. a process of determining a travel route that includes a location as a result of an auction. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2-6 and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 714), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a route, the method comprising the steps of:

a global positioning system (GPS) included in a vehicle and having a processor retrieving from a data storage unit coupled to the GPS a rule indicating that a first number of recommended routes passing through a constrained area is not permitted to exceed a second number, the rule limiting a number of recommended routes that pass through the constrained area;

subsequent to a receipt from N users of N respective requests for N routes, the GPS determining N recommended routes passing through the constrained area and presenting the N recommended routes to the N users;

subsequent to the step of determining the N recommended routes and based on a receipt of a request from a user for a determination of an (N+1)-th route, the GPS determining that a vendor wins an auction for a location of the vendor to be included in the (N+1)-th route and the GPS determining the (N+1)-th route so that the location of the vendor is included in the (N+1)-th route;

the GPS determining whether the (N+1)-th route passes through the constrained area and if the (N+1)-th route passes through the constrained area, the GPS determining whether N+1 exceeds the second number;

based in part on the vendor winning the auction, (i) if the (N+1)-th route passes through the constrained area and N+1 exceeds the second number, the GPS determining that the (N+1)-th route is not a recommended route for the user and is not to be presented to the user, even though the (N+1)-th route includes the location of the vendor who won the auction, the (N+1)-th route not being presented to the user resulting in a prevention of a traffic jam in the constrained area, or (ii) if the (N+1)-th route passes through the constrained area and N+1 does not exceed the second number, the GPS designating the (N+1)-th route as the recommended route for the user and the GPS presenting the (N+1)-th route to the user as the recommended route which passes through the constrained area and includes the location of the vendor who won the auction, or (iii) if the (N+1)-th route does not pass through the constrained area, the GPS presenting the (N+1)-th route to the user as the recommended route which includes the location of the vendor who won the auctions;

based on the (N+1)-th route passing through the constrained area and (N+1) not exceeding the second number and based on a receipt from the user or another user of a request for a determination of an (N+2)-th route, the computer determining the (N+2)-th route, which passes through the constrained area;

based on the retrieved rule and the (N+2)-th route passing through the constrained area, the computer determining N+2 is greater than the second number; and in response to the step of determining N+2 is greater than the second number, the computer identifying the constrained area as having congested traffic, the computer determining that the (N+2)-th route passes through the area having congested traffic, and the computer determining a fee to charge a second vendor whose location is included in the (N+2)-th route based on the second vendor having won a second auction, the fee promoting a reduction in additional vehicles entering the constrained area having the congested traffic.

2. The method claim 1, further comprising the step of:

providing at least one support service for at least one of creating, integrating, hosting, maintaining, and deploying computer-readable program code in the computer, the program code being executed by a processor of the computer to implement the steps of retrieving the rule, determining the N recommended routes, presenting the N recommended routes, determining that the vendor wins the auction, determining the (N+1)-th route, determining whether the (N+1)-th route passes through the constrained area, determining whether N+1 exceeds the second number if the (N+1)-th route passes thorough the constrained area, (i) if the (N+1)-th route passes through the constrained area and N+1 exceeds the second number, determining that the (N+1)-th route is not a recommended route for the user and is not to be presented to the user, or (ii) if the (N+1)-th route passes through the constrained area and N+1 does not exceed the second number, designating the (N+1)-th route as the recommended route for the user and presenting the (N+1)-th route to the user as the recommended route which passes through the constrained area and includes the location of the vendor who won the auction, or (iii) if the (N+1)-th route does not pass through the constrained area, presenting the (N+1)-th route to the user as the recommended route which includes the location of the vendor who won the auction, determining the (N+2)-th route, determining N+2 is greater than the second number, identifying the constrained area as having congested traffic, determining that the (N+2)-th route passes through the area having congested traffic, and determining the fee.

3. A computer program product, comprising:

a computer-readable storage device; and a computer-readable program code stored in the computer-readable storage device, the computer-readable program code containing instructions that are executed by a central processing unit (CPU) of a computer system, which is a global positioning system (GPS) included in a vehicle, to implement a method of determining a route, the method comprising the steps of:

the computer system retrieving from a data storage unit coupled to the GPS a rule indicating that a first number of recommended routes passing through a constrained area is not permitted to exceed a second number, the rule limiting a number of recommended routes that pass through the constrained area;

subsequent to a receipt of N requests from N respective users for N routes, the computer system determining N recommended routes passing through the constrained area and presenting the N recommended routes to the N users;

subsequent to the step of determining the N recommended routes and based on a receipt of a request from a user for a determination of an (N+1)-th route, the computer determining that a vendor wins an auction for a location of the vendor to be included in the (N+1)-th route and the computer system determining the (N+1)-th route so that the location of the vendor is included in the (N+1)-th route;

the computer system determining whether the (N+1)-th route passes through the constrained area and if the (N+1)-th route passes through the constrained area, the computer system determining whether N+1 exceeds the second number;

based in part on the vendor winning the auction, (i) if the (N+1)-th route passes through the constrained area and N+1 exceeds the second number, the computer system determining that the (N+1)-th route is not a recommended route for the user and is not to be presented to the user, even though the (N+1)-th route includes the location of the vendor who won the auction, the (N+1)-th route not being presented to the user resulting in a prevention of a traffic jam in the constrained area, or (ii) if the (N+1)-th route passes through the constrained area and N+1 does not exceed the second number, the computer system designating the (N+1)-th route as the recommended route for the user and the computer system presenting the (N+1)-th route to the user as the recommended route which passes through the constrained area and includes the location of the vendor who won the auction, or (iii) if the (N+1)-th route does not pass through the constrained area, the computer system presenting the (N+1)-th route to the user as the recommended route which includes the location of the vendor who won the auction;

based on the (N+1)-th route passing through the constrained area and (N+1) not exceeding the second number and based on a receipt from the user or another user of a request for a determination of an (N+2)-th route, the computer system determining the (N+2)-th route, which passes through the constrained area;

based on the retrieved rule and the (N+2)-th route passing through the constrained area, the computer system determining N+2 is greater than the second number; and in response to the step of determining N+2 is greater than the second number, the computer system identifying the constrained area as having congested traffic, the computer system determining that the (N+2)-th route passes through the area having congested traffic, and the computer system determining a fee to charge a second vendor whose location is included in the (N+2)-th route based on the second vendor having won a second auction, the fee promoting a reduction in additional vehicles entering the constrained area having the congested traffic.

4. A computer system comprising:

a central processing unit (CPU);

a memory coupled to the CPU; and a computer-readable storage device coupled to the CPU, the storage device containing instructions that are executed by the CPU via the memory to implement a method of determining a route, the method comprising the steps of:

the computer system, which is a global positioning system (GPS) included in a vehicle, retrieving from a data storage unit coupled to the GPS, a rule indicating that a first number of recommended routes passing through a constrained area is not permitted to exceed a second number, the rule limiting a number of recommended routes that pass through the constrained area;

subsequent to a receipt of N requests from N respective users for N routes, the computer system determining N recommended routes passing through the constrained area and presenting the N recommended routes to the N users;

subsequent to the step of determining the N recommended routes and based on a receipt of a request from a user for a determination of an (N+1)-th route, the computer system determining that a vendor wins an auction for a location of the vendor to be included in the (N+1)-th route and the computer system determining the (N+1)-th route so that the location of the vendor who won the auction is included in the (N+1)-th route;

the computer system determining whether the (N+1)-th route passes through the constrained area and if the (N+1)-th route passes through the constrained area, the computer system determining whether N+1 exceeds the second number;

based in part on the vendor winning the auction, (i) if the (N+1)-th route passes through the constrained area and N+1 exceeds the second number, the computer system determining that the (N+1)-th route is not a recommended route for the user and is not to be presented to the user, even though the (N+1)-th route includes the location of the vendor who won the auction, the (N+1)-th route not being presented to the user resulting in a prevention of a traffic jam in the constrained area, or (ii) if the (N+1)-th route passes through the constrained area and N+1 does not exceed the second number, the computer system designating the (N+1)-th route as the recommended route for the user and the computer system presenting the (N+1)-th route to the user as the recommended route which passes through the constrained area and includes the location of the vendor who won the auction, or (iii) if the (N+1)-th route does not pass through the constrained area, the computer system presenting the (N+1)-th route to the user as the recommended route which includes the location of the vendor who won the auction;

based on the (N+1)-th route passing through the constrained area and (N+1) not exceeding the second number and based on a receipt from the user or another user of a request for a determination of an (N+2)-th route, the computer system determining the (N+2)-th route, which passes through the constrained area;

based on the retrieved rule and the (N+2)-th route passing through the constrained area, the computer system determining N+2 is greater than the second number; and in response to the step of determining N+2 is greater than the second number, the computer system identifying the constrained area as having congested traffic, the computer system determining that the (N+2)-th route passes through the area having congested traffic, and the computer system determining a fee to charge a second vendor whose location is included in the (N+2)-th route based on the second vendor having won a second auction, the fee promoting a reduction in additional vehicles entering the constrained area having the congested traffic.

* * * * *